United States Patent [19]

Kenfield

[11] Patent Number: 4,674,954
[45] Date of Patent: Jun. 23, 1987

[54] WIND TURBINE WITH DAMPER

[75] Inventor: John A. C. Kenfield, Calgary, Canada

[73] Assignee: Her Majesty the Queen in Right of the Province of Alberta as Represented by the Minister of Energy and Natural Resources, Edmonton, Canada

[21] Appl. No.: 825,891

[22] Filed: Feb. 4, 1986

[51] Int. Cl.⁴ .............................................. F03D 7/04
[52] U.S. Cl. ........................................ 416/14; 416/16
[58] Field of Search ................. 416/9, 10, 16, 12–14, 416/41 A, 140 R, 196 R, 196 A, 106, 107; 188/314, 313 (U.S. only)

[56] References Cited

U.S. PATENT DOCUMENTS

| 464,607 | 12/1891 | Brown | 416/196 A X |
|---|---|---|---|
| 1,816,632 | 7/1931 | Bucklen | 416/13 X |
| 1,818,672 | 8/1931 | Bucklen | 416/13 X |
| 1,948,457 | 2/1934 | Larsen | 416/106 |
| 2,755,871 | 7/1956 | Gerstenberger | 416/106 |
| 3,667,861 | 6/1972 | Paristt | 416/16 X |
| 4,297,075 | 10/1981 | Jacobs et al. | 416/14 |
| 4,298,313 | 11/1981 | Hohenemser | 416/10 X |
| 4,372,732 | 2/1983 | Browning | 416/14 |
| 4,417,853 | 11/1983 | Cook | 416/196 A X |
| 4,439,105 | 3/1984 | Hohenemser | 416/13 |
| 4,515,525 | 5/1985 | Doman | 416/41 A X |
| 4,518,312 | 5/1985 | Jacobs et al. | 416/13 |

FOREIGN PATENT DOCUMENTS

| 667228 | 7/1963 | Canada | 188/314 |
|---|---|---|---|
| 36840 | 11/1926 | Denmark | 416/196 A |
| 926420 | 4/1955 | Fed. Rep. of Germany | 416/13 |
| 2,375,649 | 8/1978 | France | 416/13 |
| 131873 | 8/1982 | Japan | 416/137 |
| 292917 | 10/1928 | United Kingdom | 416/9 |

Primary Examiner—Everette A. Powell, Jr.
Attorney, Agent, or Firm—Ernest Peter Johnson

[57] ABSTRACT

A double-acting hydraulic cylinder is pivotally mounted between the head and tail assemblies of a wind turbine, to act as a damper. The cylinder is connected with a hydraulic fluid reservoir container. Means, such as restrictive orifices, are provided to control the rates of flow in the fluid lines between the cylinder and the reservoir, so that the rate of pivoting of the head assembly when furling is relatively fast and relatively slow when unfurling.

2 Claims, 4 Drawing Figures

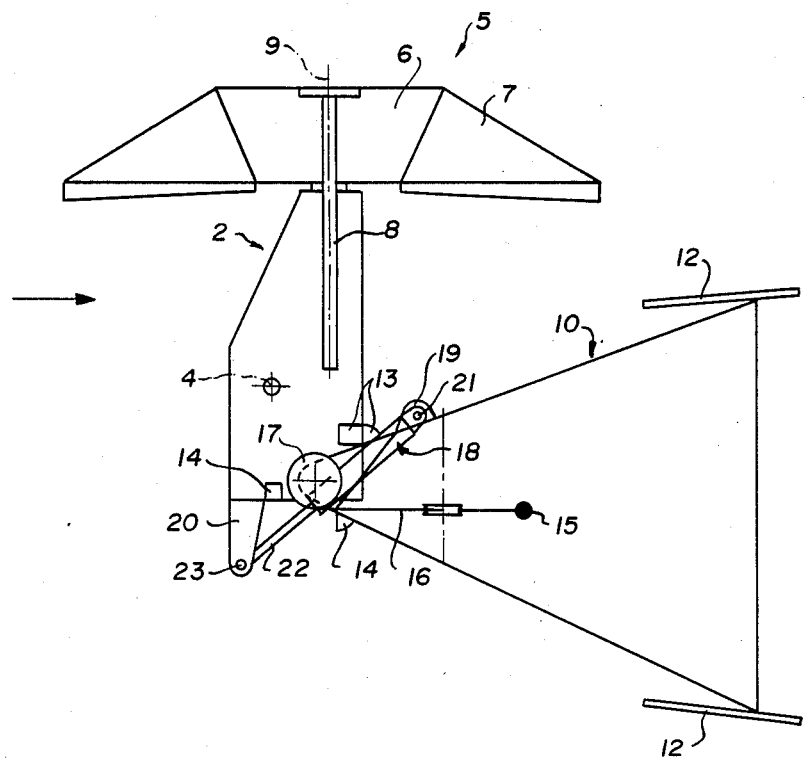
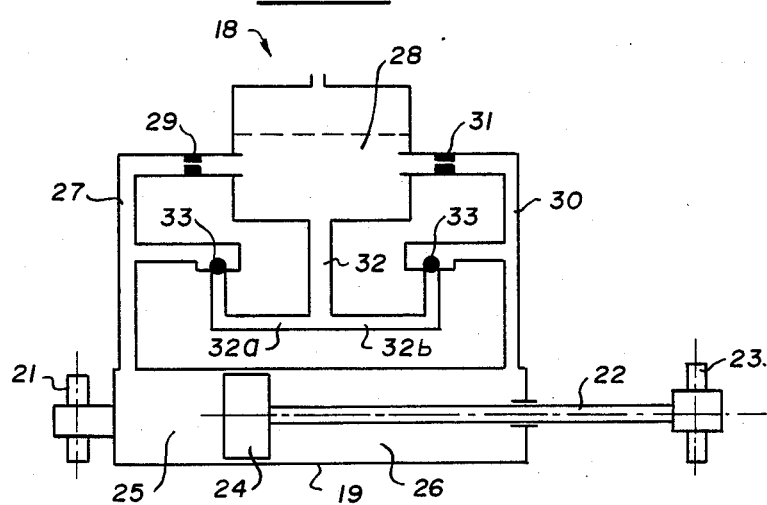

WIND TURBINE WITH DAMPER

FIELD OF THE INVENTION

This invention relates to a horizontal axis wind turbine assembly.

SUMMARY OF THE INVENTION

The present applicant has developed a wind turbine which comprises the following components in combination:

1. A head assembly, which is basically a frame, mountable on a tower so that it may extend in a horizontal plane and may pivot about a vertical axis passing through the frame, said pivot axis being termed the yaw axis;

2. A rotor assembly which comprises a central hub, which carries a plurality of rotor blades of delta wing configuration, said hub being attached to an output shaft, said rotor blades extending generally radially from the hub and being angled, so as to rotate the hub when contacted by an air flow;

3. A tail assembly which comprises a frame carrying one or more upstanding tails at the rear end thereof, said tail assembly being pivotally mounted at its front end to the rear end of the head assembly by suitable means, for pivoting about a vertical axis, whereby the tail assembly is operative to track the wind;

4. The horizontal central axis of the rotor assembly being offset from the plane of the yaw axis, whereby wind acting upon the rotor blades will exert a moment causing the head assembly to want to pivot about the yaw axis;

5. Said head and tail assemblies being provided with stops, which contact when the former reaches each of the fully operative and fully feathered positions, to prevent the head assembly from pivoting further; and 6. Means, connected with the head assembly, for applying a counterbalancing counter-rotational moment, which counter-rotational moment resists the pivoting movement caused by the wind moment, so that the head assembly will only pivot from the fully operative position, transverse to the wind direction, to a feathered position, edgewise to the wind, when the wind moment exceeds the counterbalancing moment.

Now, when applicant tested this assembly, it was found that the head assembly would pivot back and forth with unexpected velocity between the two extreme positions of being fully operative and being fully feathered. Gyroscopic moments, which would stress the rotor shaft, were developed and the contact between the head and tail assemblies was violent when their stops met.

So applicant completed the combination by pivotally mounting damping means between the tail and head assemblies, to resist the pivoting movement of the latter and slow such movement.

In a preferred form, the damping means comprises a double-acting cylinder. A reservoir container is mounted on the turbine assembly, to supply and exhaust operating oil or the like to and from the cylinder, via connecting hydraulic fluid lines. Means, such as restrictive orifices, are provided in the hydraulic fluid lines, to control the rate of fluid movement therethrough, so that the rate of pivoting of the head assembly as it moves from the operative to the feathered positions is relatively fast and when moving in the opposite direction it is relatively slow. The reason for this is that it is desirable that the machine should furl more easily than it should unfurl. This prevents it, under stormy gusting conditions, from persistently swinging back into the operational configuration between gusts only, to be re-furled again.

By choosing appropriate orifices, the rate of damping can be made substantially proportional to the square of the velocity of movement of the cylinder piston, which corresponds with the velocity of furling. The significance of this is that damping obtained in this way is highly non-linear, i.e. very slow movements can be made with negligible damping force and yet fast movements are very severly damped.

DESCRIPTION OF THE DRAWINGS

FIG. 3 is a top plan schematic view similar to FIG. 1, except that the head assembly is in the feathered position—the wind direction is indicated by the arrow; and FIG. 4 is a side schematic view showing the damping assembly, partly in section.

DESCRIPTION OF THE PREFERRED EMBODIMENT

Figure 1:
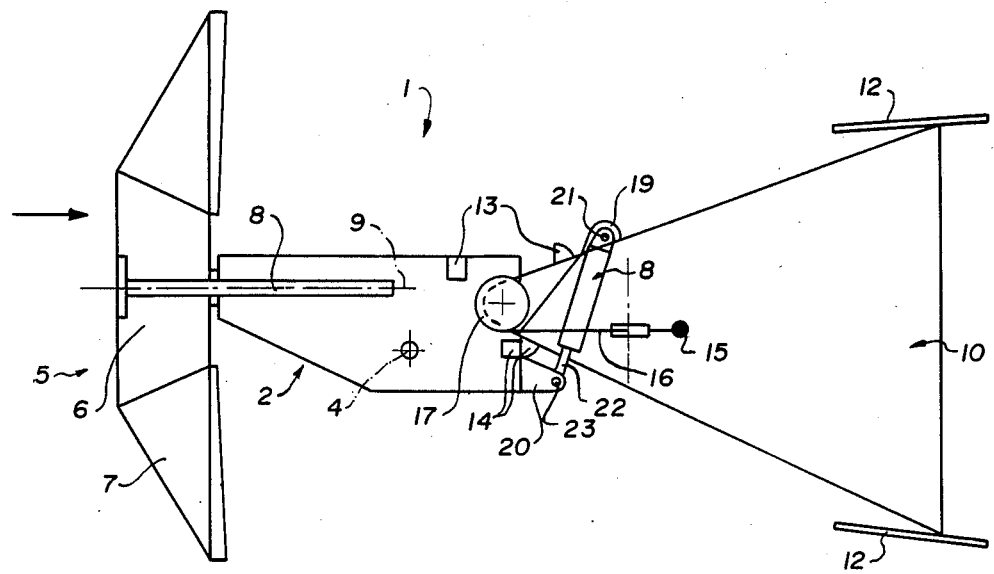
FIG. 1 is a top plan schematic view of the wind turbine assembly in the operative position—the direction of the wind is indicated by the arrow.
Figure 2:
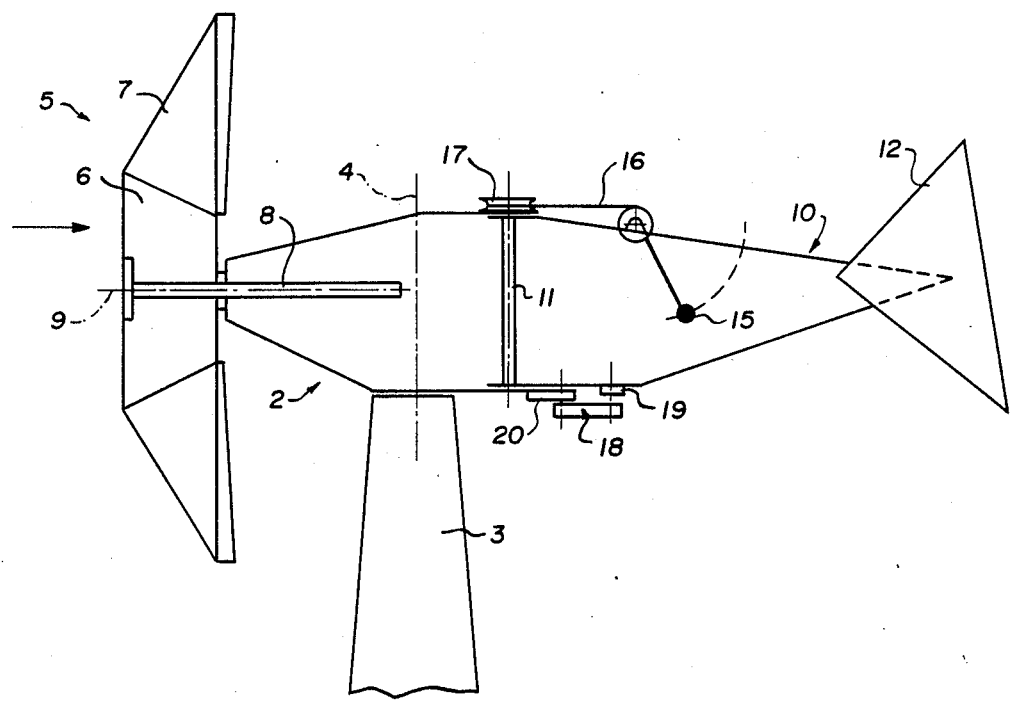
FIG. 2 is a side schematic view of the assembly, showing it mounted on the upper end of a tower and in the operative position—the direction of the wind is indicated by the arrow.

The wind turbine assembly 1 comprises a head assembly 2, which is pivotally mounted on the upper end of a tower 3. The head assembly 2 thus can pivot about a vertical axis 4 termed the yaw axis.

A rotor assembly 5 is rotatably secured to the front end of the head assembly 2. The rotor assembly 5 comprises a central hub 6 and a number of blades 7, of delta wing configuration, extending radially from the hub. The hub rotates a turbine output shaft 8, the details of which form no part of the present invention.

It is to be noted that the central horizontal axis 9 of the rotor assembly 5 is offset laterally from the yaw axis 4. Thus the wind acting on the blades 7 will exert a moment which seeks to turn the head assembly 2 about the yaw axis 4 to the feathered position illustrated in FIG. 3.

A tail assembly 10 is pivotally mounted on the rear end of the head assembly 2 by a vertically extending pin assembly 11. The tail assembly 10 has a pair of upstanding parallel tails 12 which are slightly slanted relative to the axis 9 of the rotor assembly 5.

Stops 13 and 14 are provided on the head assembly 2 and tail assembly 10, for limiting the extent of rotation of the head assembly 2.

There is provided means for applying a counterbalancing counter-rotational moment to the head assembly 2, to resist the wind moment up to a pre-determined value. Such means may comprise a counterweight 15 suspended by a cable 16 clamped to a sheave 17 which, in turn, is secured to the head assembly 2. For the wind to pivot the head assembly 5 about the yaw axis 4, it must exert sufficient moment to commence the head assembly 5 turning while simultaneously lifting the counterweight 15.

By virtue of the arrangement which has been described, the following results arise:

1. The head assembly 2 only begins to pivot when the wind velocity is great enough to overcome the maximum counterbalancing moment exerted by the counterweight 15;

2. The tails 12 cause the tail assembly 10 to track the wind; and

3. The counterweight 13 functions to maintain the tail assembly 10 and the head assembly 2 as a rigid unit until the wind moment reaches the threshold at which the head assembly begins to pivot—thus the head assembly tracks the wind together with the tail assembly until the wind moment reaches said threshold.

A double-acting, standard, hydraulic cylinder 18 is pivotally connected between the head and tail assemblies 2, 10. More particularly, a first bracket 19 extends from the side of the front end of the tail assembly 10 and a second bracket 20 extends from the side of the rear end of the head assembly 2. The cylinder body is connected by a pin 21 with the bracket 19 and the cylinder piston rod 22 is connected by a pin 23 with the bracket 20. For the head assembly 2 to pivot to the feathered position, it has to extend the cylinder 18 and cause the piston 24 to expel oil from the cylinder chamber 26; for it to pivot to the operational position, it has to compress the cylinder 18 by causing the piston 24 to expel oil from the cylinder chamber 25. Oil expelled from chamber 25 passes through return line 27 to reservoir container 28. Passage of oil through this line 27 is controlled by restrictive orifice 29. Oil expelled from chamber 26 passes through return line 30 to the reservoir container 28. Passage of oil through line 30 is controlled by restrictive orifice 31.

The orifice 31 is larger than orifice 29; thus the head assembly will move relatively rapidly (but not freely without resistance) to the feathered position and more slowly to the operative position.

Operating oil is fed by gravity to the chambers 25 and 26 by supply line 32 and its branches 32a, 32b, the latter being controlled by check valves 33.

The embodiments of the invention in which an exclusive property or privilege is claimed are defined as follows:

1. A horizontal axis wind turbine assembly comprising:

a rotor assembly having delta wing blades;

a head assembly secured at one end to the rotor assembly and being mountable on a tower so as to pivot about a vertical yaw axis;

a tail assembly pivotally mounted on the other end of the head assembly, so as to pivot about a vertical axis, said assembly having one or more upstanding tail surfaces which cooperate with the wind to cause the assembly to track the wind;

the central axis of the rotor assembly being offset from the vertical plane of the yaw axis, whereby a wind force acting on the blades will generate a moment about the yaw axis which moment urges the rotor assembly to pivot from an operative position, transverse to the wind, toward a feathered position, edgeways to the wind flow, while the tail assembly continues to track the wind;

means, connected with the head assembly, for applying a counterbalancing counter-rotational moment to the head assembly to resist the wind moment, whereby the head assembly will only pivot toward the feathered position when the wind moment exceeds the counterbalancing moment, said counterbalancing means being operative to cause the head assembly to pivot back to the operational position if the counterbalancing moment exceeds the wind moment;

a container, mounted on the wind turbine assembly, for containing a reservoir of hydraulic fluid, a double-acting cylinder being pivotally connected with the head and tail assemblies so as to resist pivoting movement of the head assembly about the yaw axis;

hydraulic fluid lines interconnecting the reservoir and the two ends of the cylinder chamber, and means for controlling the rate of fluid movement through each of the lines, whereby the rate of pivoting of the head assembly is relatively fast going out of the wind and relatively slow going into the wind.

2. The assembly as set forth in claim 1 wherein:

the means for controlling the rate of fluid movement through the lines comprises a restrictive orifice in each line.

* * * * *